United States Patent
Liao

(10) Patent No.: US 11,847,280 B2
(45) Date of Patent: *Dec. 19, 2023

(54) TOUCH PANEL AND TOUCH DETECTION CIRCUIT THEREOF

(71) Applicant: SITRONIX TECHNOLOGY CORP., Jhubei (TW)

(72) Inventor: Min-Nan Liao, Jhubei (TW)

(73) Assignee: Sitronix Technology Corp, Jhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,445

(22) Filed: Feb. 23, 2018

(65) Prior Publication Data

US 2018/0260057 A1 Sep. 13, 2018

Related U.S. Application Data

(60) Provisional application No. 62/462,427, filed on Feb. 23, 2017.

(51) Int. Cl.
*G06F 3/044* (2006.01)
*G06F 3/047* (2006.01)
(Continued)

(52) U.S. Cl.
CPC ........ *G06F 3/044* (2013.01); *G02F 1/136286* (2013.01); *G06F 3/047* (2013.01);
(Continued)

(58) Field of Classification Search
CPC ........... G06V 40/1365; G06V 40/1306; G06V 40/1318; G06V 40/14; G06V 40/13;
(Continued)

(56) References Cited

U.S. PATENT DOCUMENTS

| 7,375,714 B2 * | 5/2008 | Hara | G06K 9/0002 345/100 |
| 8,144,115 B2 * | 3/2012 | Konicek | G06F 3/04166 345/104 |

(Continued)

FOREIGN PATENT DOCUMENTS

| CN | 101241250 A | 8/2008 |
| CN | 101364262 A | 2/2009 |

(Continued)

OTHER PUBLICATIONS

Office Action and Search Report for related U.S. Appl. No. 15/903,391, dated Oct. 2, 2020.

(Continued)

*Primary Examiner* — Michael J Jansen, II
(74) *Attorney, Agent, or Firm* — Rosenberg, Klein & Lee

(57) ABSTRACT

The present invention provides a touch panel and the touch detection circuit thereof, which comprise a gate driving circuit, a source driving circuit, and a detection circuit. The gate driving circuit is coupled to a plurality of gate lines of a display panel, outputs a plurality of gate signals to the plurality of gate lines, and controls state transition of the plurality of gate signals. The source driving circuit is coupled to a plurality of source lines of the display panel. The detection circuit is coupled to the plurality of source lines or to a portion of the plurality of source lines. The detection circuit detects the levels of the plurality of signals on the coupled source lines when the gate signals change states and generates a plurality of detection signals.

26 Claims, 6 Drawing Sheets

(51) Int. Cl.
*G02F 1/1362* (2006.01)
*G06F 3/041* (2006.01)
*G02F 1/1333* (2006.01)

(52) U.S. Cl.
CPC ........ *G06F 3/0412* (2013.01); *G02F 1/13338* (2013.01); *G06F 2203/04112* (2013.01); *G09G 2300/0426* (2013.01); *G09G 2310/0264* (2013.01)

(58) Field of Classification Search
CPC .............. G09G 3/3648; G09G 3/3677; G09G 2354/00; G09G 2358/00
See application file for complete search history.

(56) References Cited

U.S. PATENT DOCUMENTS

| | | | | |
|---|---|---|---|---|
| 8,841,927 B2* | 9/2014 | Ahn | ...................... | G06F 3/0416 324/620 |
| 8,907,905 B2* | 12/2014 | Lin | ...................... | G06F 3/0416 345/173 |
| 9,086,774 B2* | 7/2015 | Hotelling | .............. | G06F 3/0412 |
| 9,740,326 B2* | 8/2017 | Shen | ...................... | G06F 3/0416 |
| 9,753,588 B2* | 9/2017 | Tsai | ...................... | G06F 3/0412 |
| 9,823,794 B2 | 11/2017 | Cho et al. | | |
| 9,880,688 B2* | 1/2018 | Akhavan Fomani | ... | G06F 3/044 |
| 9,971,927 B2* | 5/2018 | Pi | .......................... | G06F 1/1643 |
| 9,996,175 B2* | 6/2018 | Hotelling | .............. | G06F 3/0416 |
| 10,031,620 B2* | 7/2018 | Gicquel | ................ | G06F 3/0418 |
| 10,049,253 B2* | 8/2018 | Yang | ...................... | G06K 9/0002 |
| 10,203,795 B2* | 2/2019 | Liu | ........................ | G06F 3/0416 |
| 10,203,816 B2* | 2/2019 | Nelson | .................. | G06F 3/0446 |
| 10,388,207 B2* | 8/2019 | Chang | .................. | G09G 3/3275 |
| 10,496,864 B2* | 12/2019 | Jeon | .................... | G06K 9/0002 |
| 10,572,709 B2* | 2/2020 | Kang | .................. | G06F 3/0416 |
| 10,627,966 B2* | 4/2020 | Na | ........................ | G09G 3/3225 |
| 10,664,677 B2* | 5/2020 | Lee | ...................... | G06K 9/0004 |
| 2005/0083768 A1 | 4/2005 | Hara et al. | | |
| 2007/0216657 A1 | 9/2007 | Konicek | | |
| 2011/0007019 A1* | 1/2011 | Tasher | .................. | G06F 3/0416 345/174 |
| 2012/0268144 A1* | 10/2012 | Ahn | ........................ | G06F 3/044 324/679 |
| 2013/0154997 A1* | 6/2013 | Lin | ........................ | G06F 3/041 345/174 |
| 2014/0333328 A1 | 11/2014 | Nelson et al. | | |
| 2014/0375603 A1* | 12/2014 | Hotelling | .............. | G06F 3/0412 345/174 |
| 2015/0077375 A1* | 3/2015 | Hotelling | ................ | G06F 3/041 345/173 |
| 2015/0130747 A1* | 5/2015 | Tsai | ...................... | G06F 3/0412 345/174 |
| 2016/0291718 A1 | 10/2016 | Cho et al. | | |
| 2016/0291766 A1* | 10/2016 | Shen | ...................... | G06F 3/0416 |
| 2016/0350577 A1* | 12/2016 | Yang | .................... | G06K 9/00053 |
| 2017/0017340 A1* | 1/2017 | Liu | ........................ | G06F 3/0416 |
| 2017/0038866 A1* | 2/2017 | Akhavan Fomani | ... | G06F 3/044 |
| 2017/0039410 A1* | 2/2017 | Pi | .......................... | G06F 1/1643 |
| 2017/0270333 A1* | 9/2017 | Jeon | ...................... | G06K 9/001 |
| 2017/0352305 A1* | 12/2017 | Chang | .................. | G09G 3/2085 |
| 2018/0004349 A1* | 1/2018 | Gicquel | ................ | G06F 3/0418 |
| 2018/0089487 A1* | 3/2018 | Kang | .................... | G06F 3/0412 |
| 2018/0113531 A1* | 4/2018 | Na | ........................ | G06F 3/0412 |
| 2018/0173923 A1* | 6/2018 | Lee | ...................... | G06K 9/0004 |

FOREIGN PATENT DOCUMENTS

| | | |
|---|---|---|
| CN | 102169380 A | 8/2011 |
| CN | 103018992 A | 4/2013 |
| CN | 103530609 A | 1/2014 |
| CN | 104238168 A | 12/2014 |
| CN | 104282265 A | 1/2015 |
| CN | 104850292 A | 8/2015 |
| CN | 104898314 A | 9/2015 |
| CN | 105139793 A | 12/2015 |
| CN | 105785617 A | 7/2016 |
| CN | 205486037 U | 8/2016 |
| CN | 105930827 A | 9/2016 |
| CN | 106096514 A | 11/2016 |
| CN | 106383623 A | 2/2017 |
| TW | 200414070 A | 8/2004 |
| TW | 200937304 A | 9/2009 |
| TW | 200945155 A | 11/2009 |
| TW | 201227449 A | 7/2012 |

OTHER PUBLICATIONS

Office Action and Search Report for counterpart Chinese Application No. 201810155446.X, dated Oct. 9, 2020.
Office Action and Search Report for counterpart Chinese Application No. 201810155448.9, dated Mar. 25, 2019.
Office Action and Search Report for counterpart Chinese Application No. 201810155448.9, dated Nov. 21, 2019.
Search Report for counterpart Taiwanese Application No. 107106265, dated Jul. 25, 2018.

* cited by examiner

TOUCH PANEL AND TOUCH DETECTION CIRCUIT THEREOF

FIELD OF THE INVENTION

The present invention relates generally to a detection circuit, and particularly to a touch detection circuit for detecting the touch location.

BACKGROUND OF THE INVENTION

In the age of massive applications and mature technology of touch panels, the consideration for production procedure and cost becomes important increasingly. Accordingly, the so-called on-cell, in-cell, or hybrid in-cell fabrication processes for touch panels are developed. Besides, to avoid the problems of thicker panels, higher costs, or more complicated processed caused by manufacturing touch electrodes additionally, according to the China Publication Number CN102768604A, the US Publication Number U.S. Pat. No. 8,659,559, the China Publication Number CN103076935B, and the China Publication Number CN101017419B, the technologies of using the existing electrodes as the touch electrodes are disclosed, respectively. Unfortunately, no matter which technology is adopted, additional touch sensors should be fabricated, making the process complicated, the yield lowered, and the cost raised, For In-Cell processes, the usage of the touch sensors should be time-divided with the common electrode. Thereby, the control of the integrated chip on the panel becomes more complex.

Accordingly, the exemption of fabricating touch sensors and the simplification of controlling touch detection are the issues to be solved currently.

SUMMARY

An objective of the present invention is to provide a touch panel and the touch detection circuit thereof, which detect the levels of a plurality of signals on a plurality of source lines of the panel for detecting a touch. Thereby, the exemption of fabricating touch sensors and the simplification of controlling touch detection can be achieved.

The present invention discloses a touch detection circuit, which comprises a gate driving circuit, a source driving circuit, and a detection circuit. The gate driving circuit is coupled to a plurality of gate lines of a display panel, outputs a plurality of gate signals to the plurality of gate lines, and controls a state transition of the plurality of gate signals. The source driving circuit is coupled to a plurality of source lines of the display panel. The detection circuit is coupled to the plurality of source lines or to a portion of the plurality of source lines. The detection circuit detects the levels of the plurality of signals on the coupled source lines when the state of the gate signal is changed and generates a plurality of detection signals.

The present invention discloses a touch panel, which comprises a plurality of gate lines, a plurality of source lines, a gate driving circuit, a source driving circuit, and a detection circuit. The gate driving circuit is coupled to the plurality of gate lines, The gate driving circuit outputs a plurality of gate signals to the plurality of gate lines and controls a state transition of the plurality of gate signals. The source driving circuit is coupled to the plurality of source lines. The detection circuit is coupled to the plurality of source lines or to a portion of the plurality of source lines. The detection circuit detects the levels of the plurality of signals on the coupled source lines when the state of the gate signal is changed and generates a plurality of detection signals.

BRITT DESCRIPTION OF THE DRAWINGS

DETAILED DESCRIPTION

In the specifications and subsequent claims, certain words are used for representing specific devices. A person having ordinary skill in the art should know that manufacturers might use different nouns to call the same device. In the specifications and subsequent claims, the differences in names are not used for distinguishing devices. Instead, the differences in techniques as whole are the guidelines for distinguishing. In the whole specifications and subsequent claims, the word "comprising" is an open language and should be explained as "comprising but not limited to". Besides, the word "couple" includes any direct and indirect connection. Thereby, if the description is that a first device is coupled to a second device, it means that the first device is connected to the second device directly, or the first device is connected to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
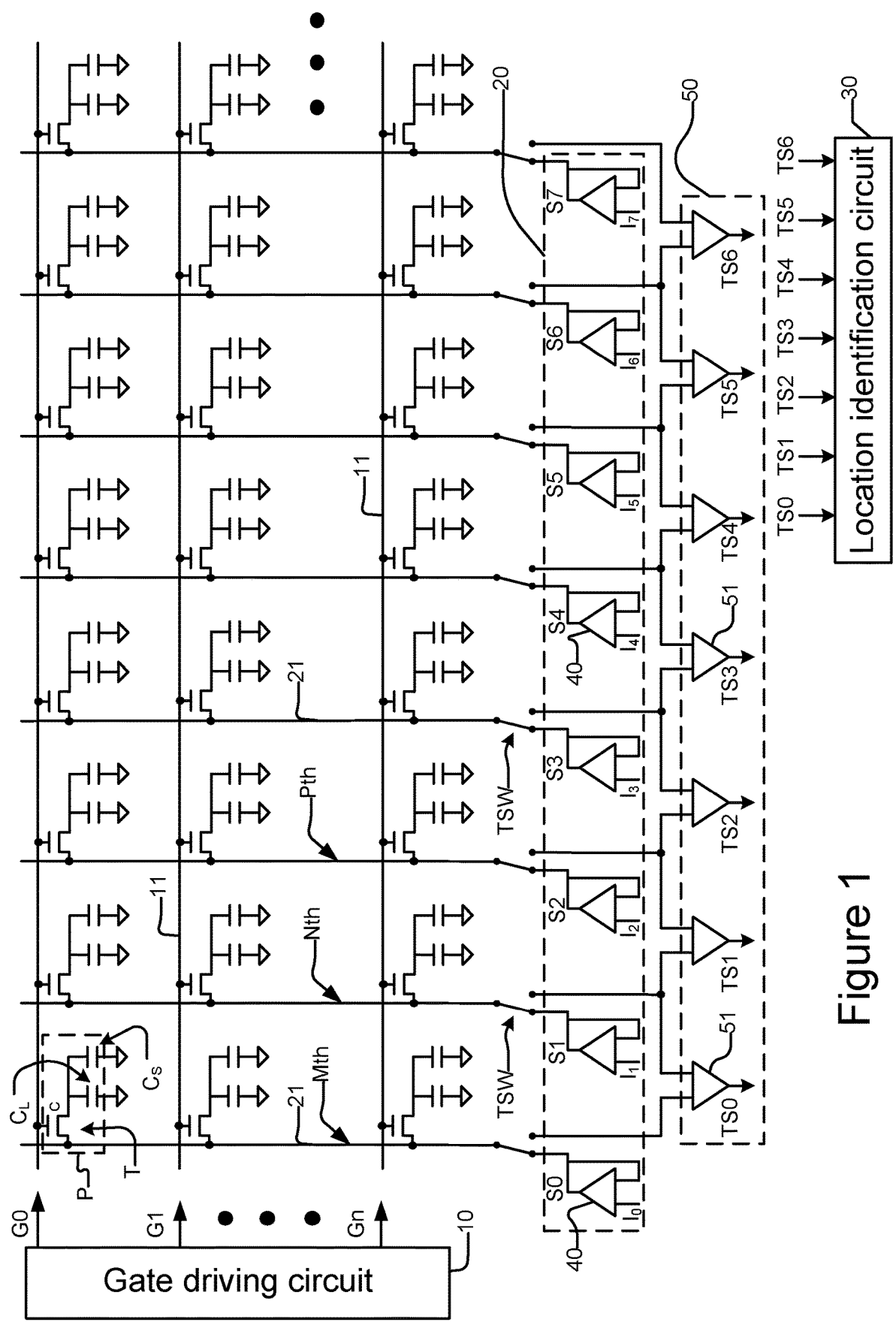
FIG. 1 shows a schematic diagram of the touch detection circuit according to the first embodiment of the present invention.

Please refer to FIG. 1, which shows a schematic diagram of the touch detection circuit according to the first embodiment of the present invention. As shown in the figure, the touch detection circuit comprises a gate driving circuit 10, a source driving circuit 20, a location identification circuit 30, a switching circuit, and a detection circuit 50. According to an embodiment of the present invention, the switching circuit includes a plurality of switches TSW; the source driving circuit 20 includes a plurality of driving units 40; and the detection circuit 50 includes a plurality of comparators 51. In addition, the display panel shown in the figure includes a plurality of gate lines 11, a plurality of source lines 21, and a plurality of pixels P. Each pixel P can include a transistor T, a liquid-crystal capacitor $C_{LC}$, and a storage capacitor $C_S$.

The gate driving circuit 10 is coupled to the plurality of gate lines 11 and outputs a plurality of gate signals G0, G1~Gn to the plurality of gate lines 11. The plurality of gate lines 11 transmits the plurality of gate signals G0, G1~Gn to the gates of the transistors T of the pixels P on each row, respectively. The gate driving circuit 10 can control the state transition of the plurality of gate signals G0, G1~Gn for controlling the transistors T of the plurality of pixels P. The plurality of driving units 40 of the source driving circuit 20 is coupled to the plurality of source lines 21, respectively, and output a plurality of source driving signals S0, S1, S2, S3, S4, S5, S6, S7 to the plurality of source lines 21 according to a plurality of input signals $I_0, I_1, I_2, I_3, I_4, I_5, I_6, I_7$. The plurality of source lines 21 transmits the plurality of source driving signals S0~S7 to the sources of the transistors T of the pixels P on each column, respectively. According to an embodiment of the present invention, the plurality of driving units 40 can be amplifiers, such as operational amplifiers. Besides, the source driving circuit 20 can further includes a plurality of digital-to-analog converters (not shown in the figure) for selecting one of a plurality of gamma voltages according to an input pixel signal, respectively, and outputting as the input signals $I_0, I_1, I_2, I_3, I_4, I_5, I_6, I_7$, respectively.

Moreover, the switching circuit is coupled between the plurality of source lines 21 and the source driving circuit 20 as well as the detection circuit 50. In other words, the switching circuit is coupled between the plurality of source lines 21 and the driving units 40 as well as the comparators 51. According to the first embodiment, the switching circuit is coupled to each source line 21. Thereby, the source driving signal S0~S7 are transmitted to the source lines 21 via the plurality of switches TSW of the switching circuit. The detection circuit 50 detects the signal levels of the source lines 21 through the switching circuit for detecting the changes in the signal of each source line 21 and generating a plurality of detection signals, The detection circuit 50 transmits the plurality of detection signals to the location identification circuit 30. The location identification circuit 30 is coupled to the detection circuit 50 for receiving the plurality of detection signals. Then it identifies the touch location on the display panel according to the plurality of detection signals. The touch includes a finger or a stylus touch on the display panel. According to the above description, the present invention can use the display panel as the touch panel directly for detecting the touch location. by detecting the signal levels of the plurality of source lines 21 of the display panel. Nonetheless, the location identification circuit 30 is not a necessary component for the embodiments of the present invention. Alternatively, the detection circuit 50 can output the plurality of detection signals (for example, via a register) to a host outside the display panel. Then the host identifies the touch location on the display panel according to the plurality of detection signals. Thereby, the present invention is not limited to using the location identification circuit 30.

Please refer again to FIG. 1. When the switching circuit is switched to the left side in the figure and connecting (turn on) the signal transmission paths between the source driving circuit 20 and the plurality of source lines 21, the source driving circuit 20 can output the source driving signals S0~S7 to the plurality of source lines 21. Contrarily, when the switching circuit is switched to the right side in the figure and connecting the signal transmission paths between the detection circuit 50 and the plurality of source lines 21, the switching circuit cuts off the connection between the driving units 40 and the plurality of source lines 21. Thereby, the source driving signals S0~S7 cannot be transmitted to the plurality of source lines 21. At this moment, the outputs of the source driving circuit 20 are floating as high impedance, Hence, the source driving signals S0~S7 will not be output for reducing the power consumption of the source driving circuit 20. As the switching circuit is switched to the right side in the figure, the detection circuit 50 receives the source driving signal of each source line 21 for generating a plurality of detection signals TS0, TS2, TS3, TS4, TS5, TS6. The outputs of the detection circuit 50 are coupled to the location identification circuit 30 and transmits the plurality of detection signals TS0~TS6 to the location identification circuit 30. In addition, according to the first embodiment, the switches TSW of the switching circuit are not limited to being switched concurrently.

In FIG. 1, each comparator 51 of the detecting circuit 50 is coupled to two source lines 21 for receiving and comparing the signal levels of the two source lines 21, and hence generating and transmitting the detection signals TS0~TS6 to the location identification circuit 30. In other words, the location identification circuit 30 acquires the signal levels of the source lines 21 according to the detection signals TS0~TS6 for identifying the touch location. As shown in the figure, the first comparator 51 compares the signal levels of an Mth (the first) source line and an Nth (the second) source line for generating the first detection signal TS0; and the second comparator 51 compares the signal levels of the Nth (the second) source line and a Pth (the third) source line for generating the second detection signal TS1. The M, N, and P described above are positive integers.

It is noteworthy that if the driving units 40 of the source driving circuit 20 are operational amplifiers, the comparators in the detection circuit 50 can alternatively be formed by the driving units 40 in the source driving circuit 20 under some specific conditions such as when the operating voltages or current are approximate, because the terminal structure of a comparator is identical to an operational amplifier and an operational amplifier can act as a comparator. In other words, according to some embodiments of the present invention, switching the connection configuration of the inputs and outputs of the driving units 40 using the switching circuit or other switching devices can turn the driving units 40 to become comparators 51 of the detection circuit 50. By sharing a portion circuit of the source driving circuit 20 and the detection circuit 50, the device count of the touch detection circuit can be further reduced.

In addition, the signal on the source lines 21 detected by the detection circuit 50 can be the source driving signal or the precharge signal. The source driving signal is the signal required for controlling the orientation of the liquid crystals in the pixel P while displaying; the precharge signal is the signal level for precharging the liquid-crystal capacitor before the source driving signal charges the liquid-crystal capacitor. Thereby, with precharging the pixel P, the charging time of the source driving circuit 20 on each pixel P can be reduced, or the output power consumption of the source driving circuit 20 can be lowered. Nonetheless, according to the first embodiment, it is not required that the touch detection circuit must include the precharging mechanism for the pixel P. In other words, the signal of the source lines 21 detected by the detection circuit 50 may the source driving signal or the precharge signal. Accordingly, once the signal level on the source lines 21 is changed, the detection circuit 50 can generate the detection signal according to the signal level of the source lines 21. Then the location identification circuit 30 or other processing circuits, such as the host described above, can identify the touch location according to the detection signal. According to an embodiment of the present invention, the source driving circuit 20 can include a circuit (not shown in the figure) for providing a predetermined initial voltage signal to the plurality of source lines 21. Hence, the detection circuit 50 can generate the detection signal according to the signal level of the source lines 21. The signal on the source lines 21 is the source line signal, for example, the source driving signal, the precharge signal, and the predetermined initial voltage signal.

Figure 2:
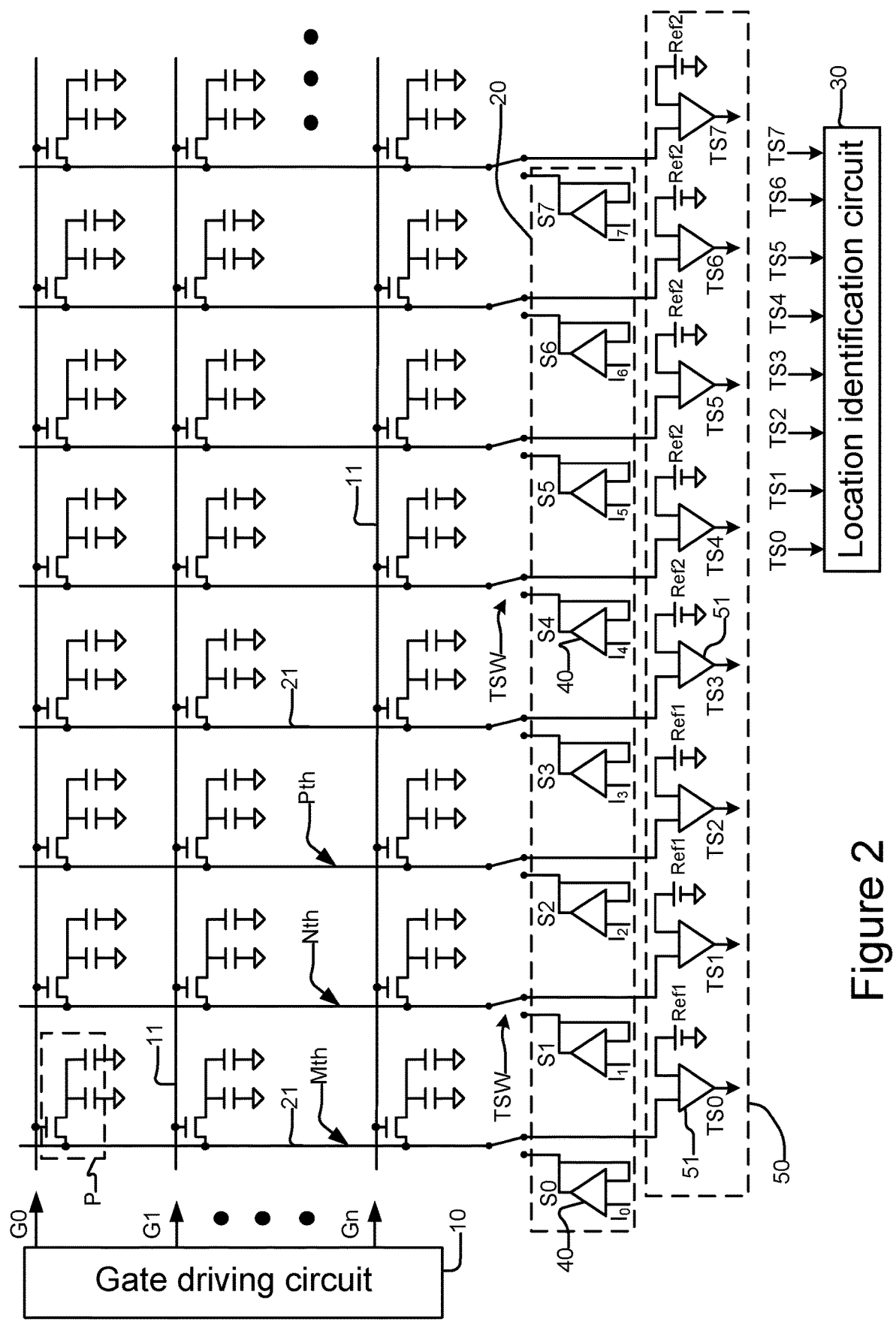
FIG. 2 shows a schematic diagram of the touch detection circuit according to the second embodiment of the present invention.

Please refer to FIG. 2, which shows a schematic diagram of the touch detection circuit according to the second embodiment of the present invention. As shown in the figure, the difference between the second embodiment and the first one is that, according to the second embodiment, the two receiving terminals of the comparator 51 in the detection circuit 50 do not receive the signal from the source lines 21. Instead, one receiving terminal receives alternatively a first reference signal Ref1 or a second reference signal Ref2. The level of the first and second reference signals Ref1, Ref2 can be the signal level of each source line 21 in a specific state. For example, if the touch detection circuit includes the precharging mechanism and when the source line 21 is transmitting the precharge signal to the pixel P, the source line 21 is at the level of the precharge signal. After a plurality of gate signals G0~Gn is transmitted to a plurality of gate lines 11, the level of the precharge signal on the source line 21 affected by the coupling influence of the plurality of gate signals G0~Gn being at the state transition (level changes) can be recorded. For example, when the gate signals G0~Gn change from the low level to the high level (the rising edge) and the display panel is not touched (or touching control), the pulled-up or pulled-down level of the precharge signal by the gate signals G0~Gn are recorded. Then the pulled-up or pulled-down level of the precharge signal can be used as the first reference signal Ref1 or the second reference signal Ref2.

Besides, the same measurement method can be used for recording the pulled-up or pulled-down level of the precharge signal by the gate signals G0~Gn when the gate signals G0~Gn are at state transition (the rising edge) and the display panel is touched. In other words, the level of the first and second reference signals Ref1, Ref2 can be set as the pulled-up or pulled-down level of the precharge signal as the display panel is touched.

When the process variation for the display panel is negligible, all comparators 51 can adopt the same reference signal as the basis for comparison. Nonetheless, when the coupling effects of the plurality of gate signals G0~Gn on both sides of the display panel are different, the several comparators 51 on the left side can adopt the first reference signal Ref1 as the basis for comparison while the several comparators 51 on the right side can adopt the second reference signal Ref2 as the basis for comparison while, as shown in the second embodiment. Here, the second reference signal Ref2 is acquired by the measurement and recording as described above. Hence, the details will not be described again.

Figure 3:
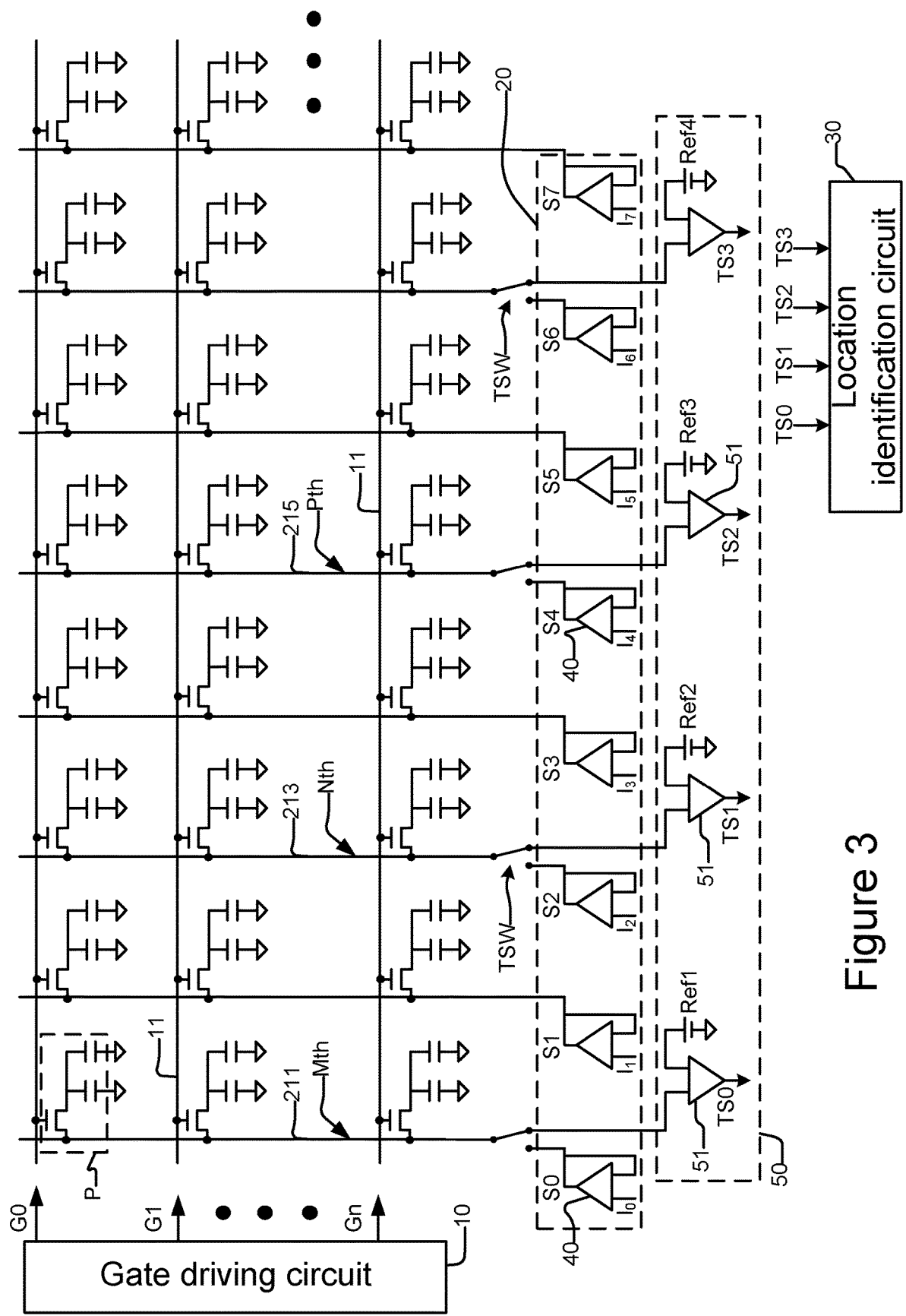
FIG. 3 shows a schematic diagram of the touch detection circuit according to the third embodiment of the present invention.

Please refer to FIG. 3, which shows a schematic diagram of the touch detection circuit according to the third embodiment of the present invention. As shown in the figure, the difference between the third embodiment and the second one is that, according to the third embodiment, each comparator 51 of the detection circuit 50 is coupled to a different reference signal, such as the first reference signal Ref1, the second reference signal Ref2, the third reference signal Ref3, and the fourth reference signal Ref4. In addition, the detection circuit 50 in FIG. 3 does not detect the state (change) of the signal level on every source line. Namely, there is another source line between the Mth (the first) source line 211 coupled to the first comparator 51 and the Nth (the third) source line 213 coupled to the second comparator 51. Likewise, there is another source line between the Pth (the fifth) source line 211 coupled to the third comparator 51 and the Nth (the third) source line 213. Thereby, under cost consideration and without influencing touch identification, two or more source lines can be placed between the Mth source line 211 and the Nth source line 213; two or more source lines can be placed between the Pth source line 215 and the Nth source line 213. According to the above description, the detection circuit 50 according to the third embodiment detects the signal levels of the coupled source lines 21 by coupling a portion of the plurality of source lines 21 through the switching circuit for generating the detection signal, and thus trading off between the overall cost and detection resolution. Accordingly, the switching circuit according to the third embodiment can be coupled to a portion of the plurality of source lines and a portion of the driving units 40 in the source driving circuit 20.

Please refer again to FIG. 3. The first comparator 51 compares the signal level of the Mth source line 211 with the level of the first reference signal Ref1 for generating the first detection signal TS0; the second comparator 51 compares the signal level of the Nth source line 213 with the level of the second reference signal Ref2 for generating the second detection signal TS1; and the third comparator 51 compares the signal level of the Pth source line 215 with the level of the third reference signal Ref3 for generating the third detection signal TS2. The detection signals TS0, TS1, TS2 are all transmitted to the location identification circuit 30 for identifying the touch location.

Figure 4B:
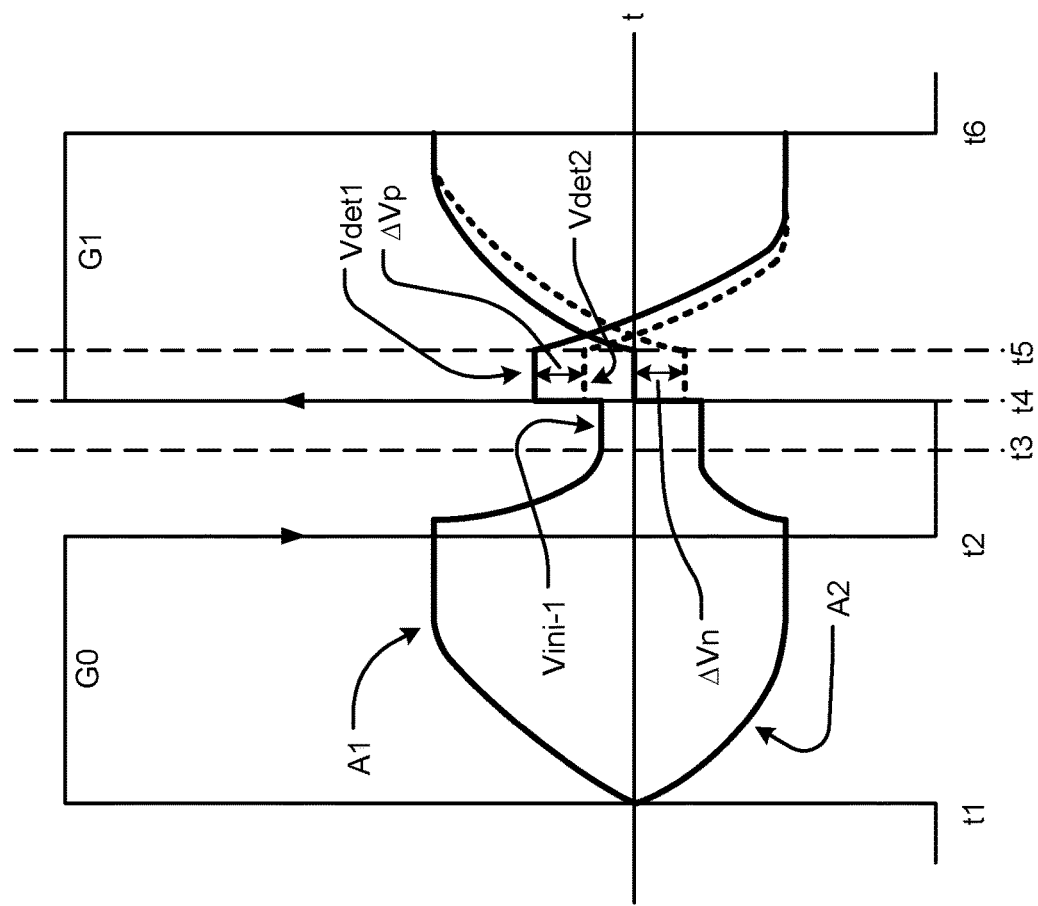
FIGS. 4A and 4B show schematic diagrams of detecting a touch according to the first embodiment of the present invention.
Figure 4A:
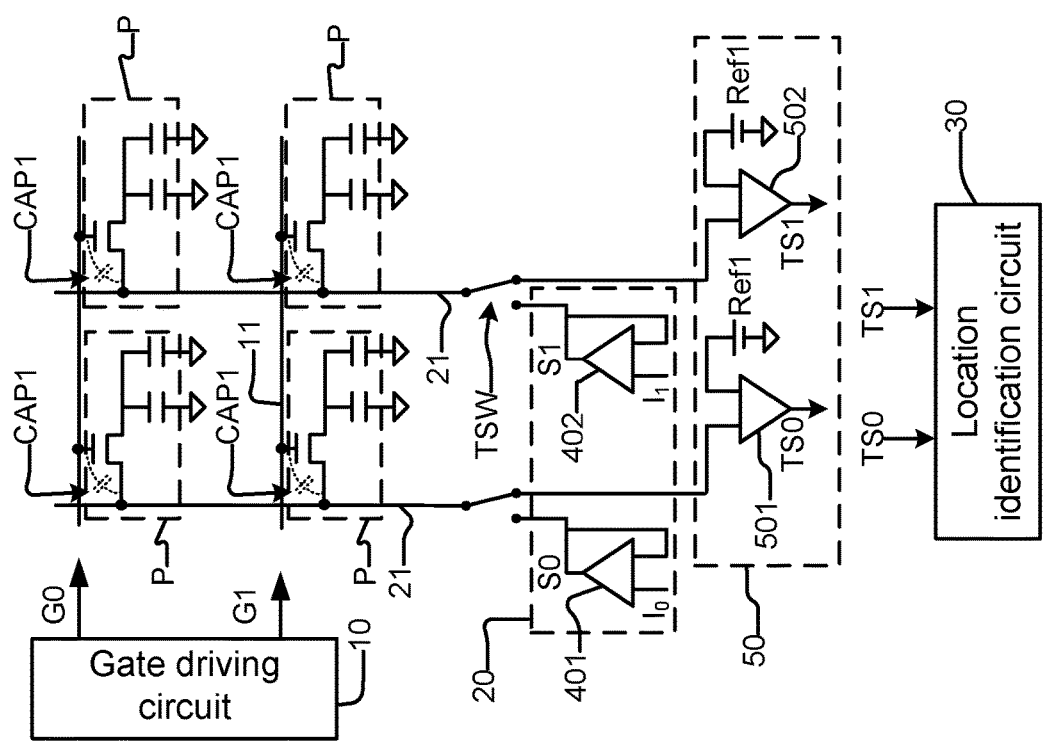

Please refer to FIGS. 4A and 4B, which show schematic diagrams of detecting a touch according to the first embodiment of the present invention. As shown in the figures, at time t1, the gate signal G0 changes to the high level, and the driving units 401, 402 of the source driving circuit 20 output the source driving signals S0, S1 to the source lines 21 for charging the pixels P. The waveforms of the source driving signals S0, S1 are the curves A1, A2 between time t1 and t2. The polarities of the source driving signals S0, S1 are different. After the gate signal G0 drives the pixels P on the first row of the display panel, the gate signal G0 is changed from the high level to the low level at time t2.

In the period between time t2 and t3, the voltage levels of the signals on the source lines 21 continue to change. In the period between time t3 and t4, the voltage levels of the signals on the source lines 21 are kept constant and can be used as the initial voltage Vini-1 for touch detection. At time t4, the gate signal GI starts to change from the low level to the high level. At this moment, the switch TSV of the switching circuit is not closed yet, so the electrical paths between the source lines 21 and the driving units 401, 402 of the source driving circuit 20 are not connected. Thereby, the gate signal G1 will be coupled to the signals on the source lines 21 through the parasitic capacitance CAP1 and thus raising the initial voltage Vini-1 on the source lines 21. As the display panel is not touched, the initial voltage Vini-1 is raised to the first voltage level Vdet1. When the source lines 21 (the display panel) are touched, due to the inductive capacitance caused by an external conductor touching the display panel, the amplitude of the gate signal GI raising the initial voltage Vini-1 through the coupling effect is reduced. Hence, the initial voltage Vini-1 is raised to the second voltage level Vdet2 at this time. In addition, according to FIG. 4B, the first voltage level Vdet1 is higher than the second voltage level Vdet2. A first voltage difference $\Delta Vp$ between the first voltage level Vdet1 and the second voltage level Vdet2 corresponding to the states when the display panel is not or is touched, respectively, appears. Accordingly, the detection circuit 50 detects the signal levels of the plurality of source lines 21 as the gate signals have state transition. By comparing the signal levels with the signals of adjacent source lines or comparing the signals of source lines with a reference signal, the corresponding detection signals will be given. Then the signal level of the source lines 21 will be known, and the touch location on the display panel will be identified. The above parasitic capacitance CAP1 is located between the gate and the source of the transistor in the pixels P.

Furthermore, according to the embodiments from FIG. 1 to FIGS. 4A and 4B, the touch detection circuit according to the present invention relies on no extra touch electrodes (the transmitting touch electrode TX and the receiving touch electrode RX). No extra touch sensor is required, either. On the contrary, the detection circuit according to the present invention identifies a touch by the level changes of the gate signals G0~Gn on the plurality of gate lines 11 of the display panel and the signals of the plurality of source lines 21 (the source driving signal, the precharge signal, or the predetermined initial voltage signal). Thereby, the complexity of the driving circuit of the touch panel in processing the display and in touch identification can be reduced.

To elaborate, please refer again to FIGS. 4A and 4B. While approaching time t4 or in the period between time t4 and t5, the switch TSW of the switching circuit connects the signal transmission path between the comparator 501 of the detection circuit 50 and the source line 21. The comparator 501 receives the initial voltage Vini-1 coupled with the gate signal G1. The voltage level of the initial voltage Vini-1 coupled with the gate signal G1 can be either the first voltage level Vdet1 or the second voltage level Vdet2. The comparator 501 compares the initial voltage coupled with the gate signal G1 to the level of the first reference signal Ref1 for generating the detection signal TS0. If the reference signal Ref1 is the signal level of the source line 21 when the touch panel is not touched, as a conductor touches the source line 21 coupled with the comparator 501, the first reference signal Ref1 is higher than the second voltage level Vdet2. Thereby, the detection signal TS0 output by the comparator 501 can be at the high level. Then, a high-leveled detection signal TS0 means that the source line coupled with the comparator 501 is touched by a conductor. The location identification circuit 30 can identify that the source line coupled with the comparator 501 is touched by a conductor, meaning that the touch location can be identified. Alternatively, the location identification circuit 30 can generate a location identification signal for another processing circuit, such as the host described above. Then the processing circuit controls to execute the function corresponding to the conductor touch or to move the cursor.

At time t5, the switching circuit cuts off the electrical coupling path between the detection circuit 50 and the source line 21 and connects the electrical coupling path between the source driving circuit 20 and the source line 21. Thereby, the source driving circuit 20 outputs the source driving signal S0 and starts to charge the pixel P, and the polarity of the source driving signal S0 is inverted from the positive polarity between time t1 and t2 to the negative polarity between time t5 and t. In addition, as shown in FIG. 4B, the polarity of the other signal (the one below the t-axis) is opposite to the polarity of the above signal. Between time t4 and t5, there is a second voltage difference ΔVn on the signal between the source line being touched or not touched by a conductor. The rest detection method is the same as the above. According to an embodiment of the present invention, the switching circuit can be controlled by the gate driving circuit 10, which can generate the switching signal according to the state of the gate signals G0~Gn. According to another embodiment of the present invention, another circuit can be adapted to generate the switching signal according to the state of the gate signals G0~Gn for controlling the switching circuit. It is not limited to the gate driving circuit 10.

Figure 5B:
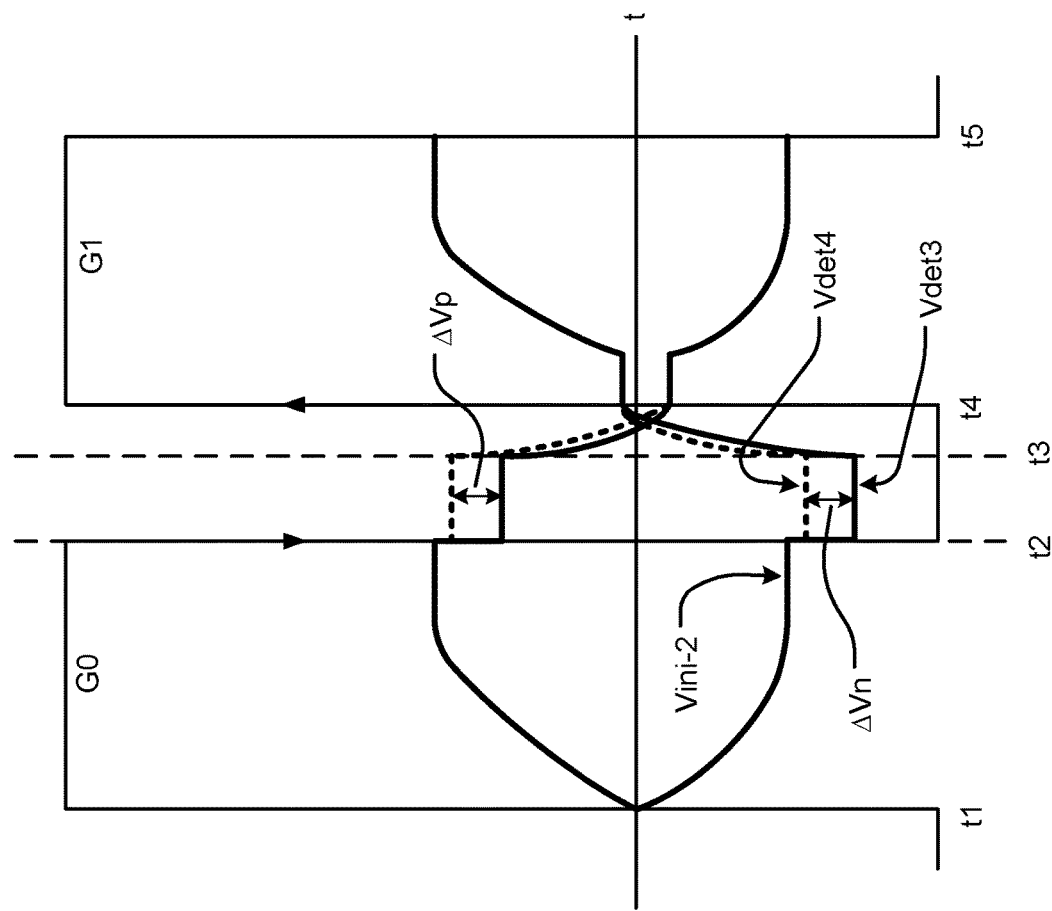
FIGS. 5A and 5B show schematic diagrams of detecting a touch according to the second embodiment of the present invention.
Figure 5A:
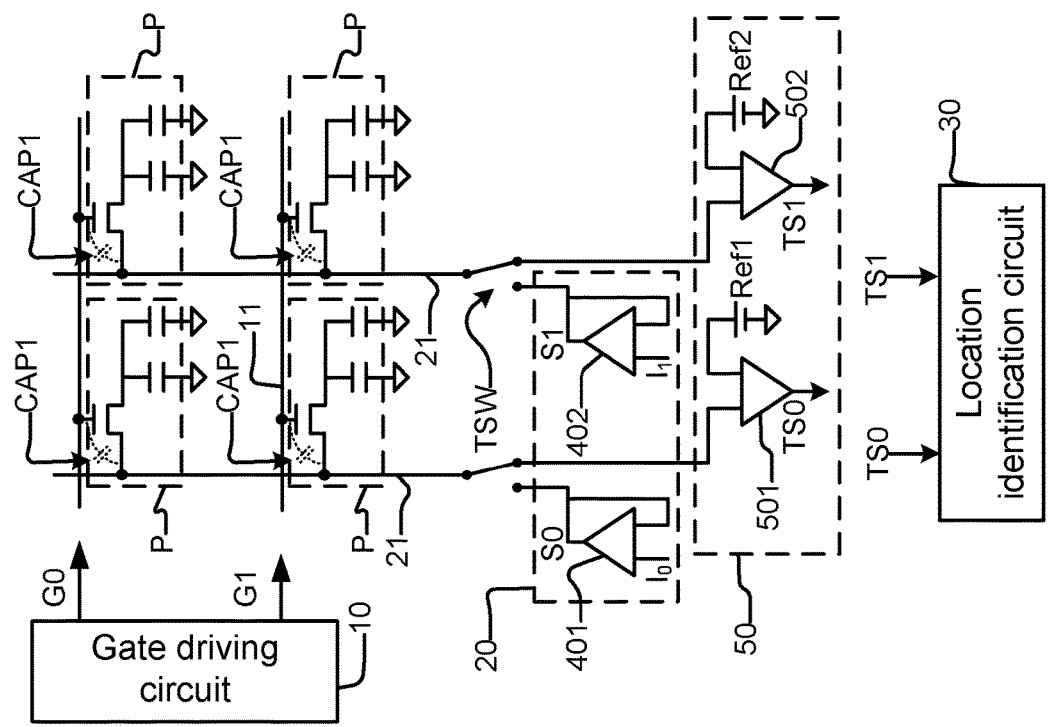

Please refer to FIGS. 5A and 5B, which show schematic diagrams of detecting a touch according to the second embodiment of the present invention. As shown in the figures, according to the present embodiment, when the gate signal G0 changes from the high level to the low level, the signal level of the source line 21 is detected. In other words, while approaching time t2, the switching circuit first cuts off the electrical connection paths between the plurality of source lines 21 and the source driving circuit 20 and connects the electrical connecting paths between the source lines 21 and the detection circuit 50. In the period between time t2 and t3, when the display panel is not touched, the voltage level Vini-2 of the source line 21 will be pulled down to the third voltage level Vdet3 due to the coupling with the gate signal G0 through the parasitic capacitance CAP1. When the source line 21 of the display panel is touched, the voltage level Vini-2 will be pulled down to the fourth voltage level Vdet4. According to FIG. 5B, the third voltage level Vdet3 is lower than the fourth voltage level Vdet4 and the difference therebetween is a second voltage difference ΔVn. Next, the operation after time t3 is as the description for the embodiment in FIGS. 4A and 4B. The difference between the embodiment in FIGS. 4A and 4B and the one in FIGS. 5A and 5B is on touch detection according to the falling or rising edge of the gate signals G0, G1. In other words, although the embodiments from FIG. 1 to FIGS. 5A and 5B are not completely the same, they are all based on the signal level change on the source lines 21 due to the coupling of the gate signals G0~Gn to the source lines 21 through the parasitic capacitance CAP1. Then touch detection is achieved according to the signal level on the source lines 21. Thereby, the present invention is not limited to the coupling relation between the plurality of source lines 21 and the comparators 51 of the detection circuit 50; the present invention is not limited to the configuration of the reference signals Ref1, Ref2, either.

Figure 6:
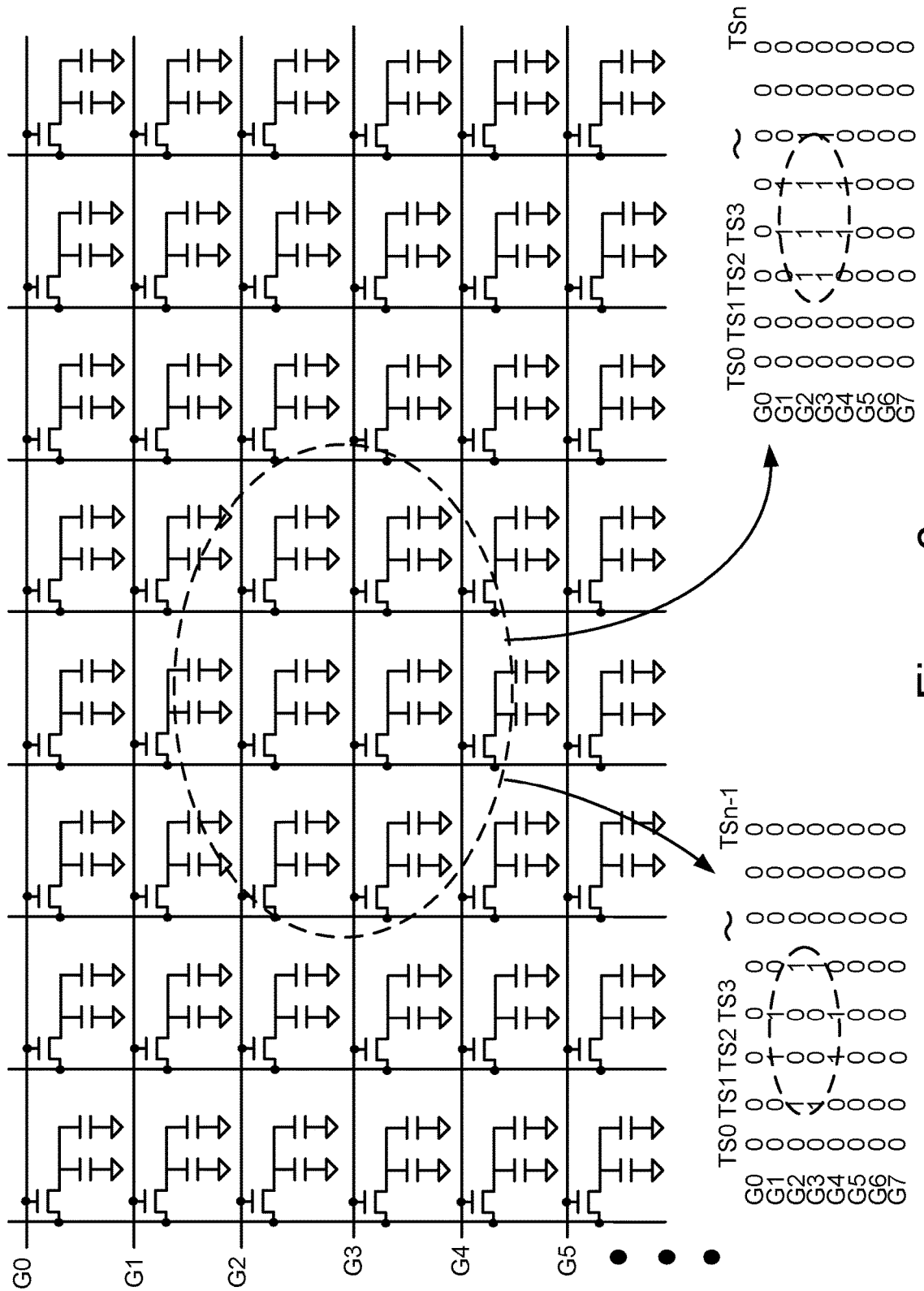
FIG. 6 shows a schematic diagram of the levels of the detection signals for detecting a touch according to the present invention.

Please refer to FIG. 6, which shows a schematic diagram of the levels of the detection signals for detecting a touch according to the present invention. As shown in the figure, the dashed circle is the touch location by a conductor. At the location of the display panel where the conductor touches, the level of the detection signal output by the comparator 51 is high (1); at the location of the display panel where the conductor does not touch, the level of the detection signal output by the comparator 51 is low (0). The bottom right figure in FIG. 6 is a schematic diagram of the comparator 51 comparing the signals on the source lines 21 to the reference signal; the bottom left figure in FIG. 6 is a schematic diagram of the comparator 51 comparing the signals on two source lines 21.

To sum up, the present invention discloses a touch detection circuit, which comprises a gate driving circuit, a source driving circuit, and a detection circuit. The gate driving circuit is coupled to a plurality of gate lines of a display panel, outputs a plurality of gate signals to the plurality of gate lines, and controls state transition of the plurality of gate signals. The source driving circuit is coupled to a plurality of source lines of the display panel. The detection circuit is coupled to the plurality of source lines or to a portion of the plurality of source lines. The detection circuit detects the levels of the plurality of signals on the coupled source lines when the gate signals change states and generates a plurality of detection signals. Accordingly, the touch detection circuit according to the present invention relies on no extra touch electrodes (the transmitting touch electrode TX and the receiving touch electrode RX). No extra touch sensor is required, either. The detection circuit according to the present invention identifies a touch (or touching control) by the level changes of the gate signals on the plurality of gate lines of the display panel and the signals of the plurality of source lines (the source driving signal, the precharge signal, or the predetermined initial voltage signal). Thereby, the complexity of the driving circuit of the touch panel in processing the display and in touch identification can be reduced.

The invention claimed is:

1. A touch detection circuit, applied for touch detection, said touch detection circuit coupled to a plurality of gate lines of a display panel, and outputting a plurality of gate signals to said plurality of gate lines, said touch detection circuit comprising:
a source driving circuit, coupled to a plurality of source lines of said display panel; and
a detection circuit, coupled to said plurality of source lines or a portion of said plurality of source lines, detecting the level of a plurality of signals on said plurality of source lines coupled to said detection circuit, and generating a plurality of detection signals for touch detection;
wherein said gate signal on said plurality of gate lines has a changed level, said changed level of said gate signal pulls up or pulls down the level of said plurality of signals on said plurality of source lines coupled to said detection circuit, and said detection circuit detects said pulled-up level or pulled-down level of said plurality of signals on said plurality of source lines and generates said plurality of detection signals for touch detection.

2. The touch detection circuit of claim 1, and further comprising a switching circuit, coupled between said plurality of source lines or said portion of said plurality of source lines and said source driving circuit as well as said detection circuit, and said detection circuit detecting the level of said plurality of signals of said plurality of source lines coupled to said detection circuit when said switching circuit cuts off the connection between said plurality of source lines or said portion of said plurality of source lines and said source driving circuit.

3. The touch detection circuit of claim 2, wherein said source driving circuit includes a plurality of driving units coupled to said plurality of source lines, respectively, for outputting a plurality of source driving signals to said plurality of source lines; said plurality of driving units or a portion of said plurality of driving units are coupled to said switching circuit; and
said detection circuit detects the level of said plurality of signals of said plurality of source lines coupled to said detection circuit when said switching circuit cuts off the connection between said plurality of source lines and said plurality of driving units or between said portion of said plurality of source lines and said portion of said plurality of driving units.

4. The touch detection circuit of claim 2, wherein said source driving circuit outputs said plurality of source driving signals to said plurality of source lines when said switching circuit cuts off the connection between said plurality of source lines or said portion of said plurality of source lines and said detection circuit.

5. The touch detection circuit of claim 1, wherein when said detection circuit detects the level of said plurality of signals of said plurality of source lines coupled to said detection circuit, the signal of said plurality of source lines coupled to said detection circuit is the sum of a source driving signal, a precharge signal, or a predetermined initial voltage signal coupled with said gate signal.

6. The touch detection circuit of claim 1, and further comprising a location identification circuit, coupled to said detection circuit, and identifying a touch location according to said plurality of detection signals.

7. The touch detection circuit of claim 1, wherein said detection circuit includes a plurality of comparators, coupled to said plurality of source lines or said portion of said plurality of source lines, generating said plurality of detection signals, a first comparator of said plurality of comparators comparing the signal level of an Mth source line with the signal level of an Nth source line for generating a first detection signal of said plurality of detection signals, a second comparator of said plurality of comparators comparing the signal level of said Nth source line with the signal level of a Pth source line for generating a second detection signal of said plurality of detection signals, and M, N, P being positive integers.

8. The touch detection circuit of claim 7, wherein said Mth source line and said Nth source line are arranged in order and adjacent to each other.

9. The touch detection circuit of claim 7, wherein said Mth source line and said Nth source line are spaced by one or more source line.

10. The touch detection circuit of claim 1, wherein said detection circuit includes a plurality of comparators, coupled to said plurality of source lines or said portion of said plurality of source lines, generating said plurality of detection signals, including a first comparator and a second comparator, said first comparator comparing the signal level of an Mth source line with the level of a reference signal for generating a first detection signal of said plurality of detection signals, said second comparator comparing the signal level of an Nth source line with the level of said reference signal for generating a second detection signal of said plurality of detection signals, and M, N being positive integers.

11. The touch detection circuit of claim 10, wherein said Mth source line and said Nth source line are arranged in order and adjacent to each other.

12. The touch detection circuit of claim 10, wherein said Mth source line and said Nth source line are spaced by one or more source line.

13. The touch detection circuit of claim 1, wherein said detection circuit includes a plurality of comparators, coupled to said plurality of source lines or said portion of said plurality of source lines, generating said plurality of detection signals, including a first comparator and a second comparator, said first comparator comparing the signal level of an Mth source line with the level of a first reference signal for generating a first detection signal of said plurality of detection signals, said second comparator comparing the signal level of an Nth source line with the level of a second reference signal for generating a second detection signal of said plurality of detection signals, and M, N being positive integers.

14. A touch panel, applied for touch detection, comprising:
a plurality of gate lines, transmitting a plurality of gate signals;
a plurality of source lines;
a source driving circuit, coupled to said plurality of source lines; and
a detection circuit, coupled to said plurality of source lines or a portion of said plurality of source lines, detecting the level of a plurality of signals on said plurality of source lines coupled to said detection circuit, and generating a plurality of detection signals for touch detection;
wherein said gate signal on said plurality of gate lines has a changed level, said changed level of said gate signal pulls up or pulls down the level of said plurality of signals on said plurality of source lines coupled to said detection circuit, and said detection circuit detects said pulled-up level or pulled-down level of said plurality of signals on said plurality of source lines and generates said plurality of detection signals for touch detection.

15. The touch panel of claim 14, and further comprising a switching circuit, coupled between said plurality of source lines or said portion of said plurality of source lines and said source driving circuit as well as said detection circuit, and said detection circuit detecting the level of said plurality of signals of said plurality of source lines coupled to said detection circuit when said switching circuit cuts off the connection between said plurality of source lines or said portion of said plurality of source lines and said source driving circuit.

16. The touch panel of claim 15, wherein said source driving circuit includes a plurality of driving units coupled to said plurality of source lines, respectively, for outputting a plurality of source driving signals to said plurality of source lines; said plurality of driving units or a portion of said plurality of driving units are coupled to said switching circuit; and said detection circuit detects the level of said plurality of signals of said plurality of source lines coupled to said detection circuit when said switching circuit cuts off the connection between said plurality of driving units and said plurality of source lines or between said portion of said plurality of source lines and said portion of said plurality of driving units.

17. The touch panel of claim 15, wherein said source driving circuit outputs said plurality of source driving signals to said plurality of source lines when said switching circuit cuts off the connection between said plurality of source lines or said portion of said plurality of source lines and said detection circuit.

18. The touch panel of claim 14, wherein when said detection circuit detects the level of said plurality of signals of said plurality of source lines coupled to said detection circuit, the signal of said plurality of source lines coupled to said detection circuit is the sum of a source driving signal, a precharge signal, or a predetermined initial voltage signal coupled with said gate signal.

19. The touch panel of claim 14, and further comprising a location identification circuit, coupled to said detection circuit, and identifying a touch location according to said plurality of detection signals.

20. The touch panel of claim 14, wherein said detection circuit includes a plurality of comparators, coupled to said plurality of source lines or said portion of said plurality of source lines, generating said plurality of detection signals, a first comparator of said plurality of comparators comparing the signal level of an Mth source line with the signal level of an Nth source line for generating a first detection signal of said plurality of detection signals, a second comparator of said plurality of comparators comparing the signal level of said Nth source line with the signal level of a Pth source line for generating a second detection signal of said plurality of detection signals, and M, N, P being positive integers.

21. The touch panel of claim 20, wherein said Mth source line and said Nth source line are arranged in order and adjacent to each other.

22. The touch panel of claim 20, wherein said Mth source line and said Nth source line are spaced by one or more source line.

23. The touch panel of claim 14, wherein said detection circuit includes a plurality of comparators, coupled to said plurality of source lines or said portion of said plurality of source lines, generating said plurality of detection signals, including a first comparator and a second comparator, said first comparator comparing the signal level of an Mth source line with the level of a reference signal for generating a first detection signal of said plurality of detection signals, said second comparator comparing the signal level of an Nth source line with the level of said reference signal for generating a second detection signal of said plurality of detection signals, and M, N being positive integers.

24. The touch panel of claim 23, wherein said Mth source line and said Nth source line are arranged in order and adjacent to each other.

25. The touch panel of claim 23, wherein said Mth source line and said Nth source line are spaced by one or more source line.

26. The touch panel of claim 14, wherein said detection circuit includes a plurality of comparators, coupled to said plurality of source lines or said portion of said plurality of source lines, generating said plurality of detection signals, including a first comparator and a second comparator, said first comparator comparing the signal level of an Mth source line with the level of a first reference signal for generating a first detection signal of said plurality of detection signals, said second comparator comparing the signal level of an Nth source line with the level of a second reference signal for generating a second detection signal of said plurality of detection signals, and M, N being positive integers.

* * * * *